United States Patent
Kang et al.

(10) Patent No.: US 8,585,087 B2
(45) Date of Patent: Nov. 19, 2013

(54) KNEE BOLSTER BRACKET

(75) Inventors: Stephen Hongbin Kang, Canton, MI (US); Leonard Anthony Shaner, New Baltimore, MI (US); Sarah Certeza, Grosse Pointe Farms, MI (US); Barbara Ann McKeehan, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 57 days.

(21) Appl. No.: 13/286,246

(22) Filed: Nov. 1, 2011

(65) Prior Publication Data

US 2013/0106086 A1    May 2, 2013

(51) Int. Cl.
*B60R 21/045* (2006.01)

(52) U.S. Cl.
USPC .......................................................... 280/751

(58) Field of Classification Search
CPC .................. B60R 21/04; B60R 21/045; B60R 2021/0051
USPC .................. 280/748, 751, 752; 188/371, 377; 180/90; 296/39.1, 70, 187.05, 193.02
See application file for complete search history.

(56) References Cited

U.S. PATENT DOCUMENTS

| | | | | |
|---|---|---|---|---|
| 3,528,530 A | * | 9/1970 | Franck et al. | 188/377 |
| 3,779,595 A | * | 12/1973 | Suzuki et al. | 296/187.05 |
| 3,972,390 A | * | 8/1976 | Melton et al. | 188/377 |
| 5,066,064 A | * | 11/1991 | Garnweidner | 296/146.6 |
| 5,413,379 A | | 5/1995 | Koma | |
| 5,865,468 A | * | 2/1999 | Hur | 280/752 |
| 5,927,755 A | * | 7/1999 | Matsuo et al. | 280/752 |
| 5,951,045 A | * | 9/1999 | Almefelt et al. | 280/748 |
| 6,170,872 B1 | * | 1/2001 | Bair et al. | 280/751 |
| 6,491,322 B1 | * | 12/2002 | Ryner | 280/751 |
| 6,883,833 B2 | * | 4/2005 | Yamazaki et al. | 280/751 |
| 7,128,342 B2 | | 10/2006 | Davis | |
| 7,393,012 B2 | | 7/2008 | Funakura | |
| 2006/0113781 A1 | * | 6/2006 | Dancasius et al. | 280/752 |
| 2006/0131861 A1 | * | 6/2006 | Mani | 280/752 |
| 2008/0093831 A1 | * | 4/2008 | Ellison | 280/752 |

FOREIGN PATENT DOCUMENTS

EP    1842730 A1    4/2006

OTHER PUBLICATIONS

American Heritage Dictionary Entry: flange, available at, http://www.ahdictionary.com/word/search.html?q=flange (last visited Aug. 29, 2013).*

* cited by examiner

*Primary Examiner* — Joseph Rocca
(74) *Attorney, Agent, or Firm* — Angela M. Brunetti; Frank MacKenzie

(57) ABSTRACT

A knee bolster assembly having a vehicle frame structure, a bracket structure having a base portion and two contoured side wall portions that extend from the base portion to ends that attach to the frame structure, a trigger point occurs in each side wall portion at a first maximum width and a first minimum width between side wall portions, and a knee bolster plate cooperating with the base portion.

18 Claims, 3 Drawing Sheets

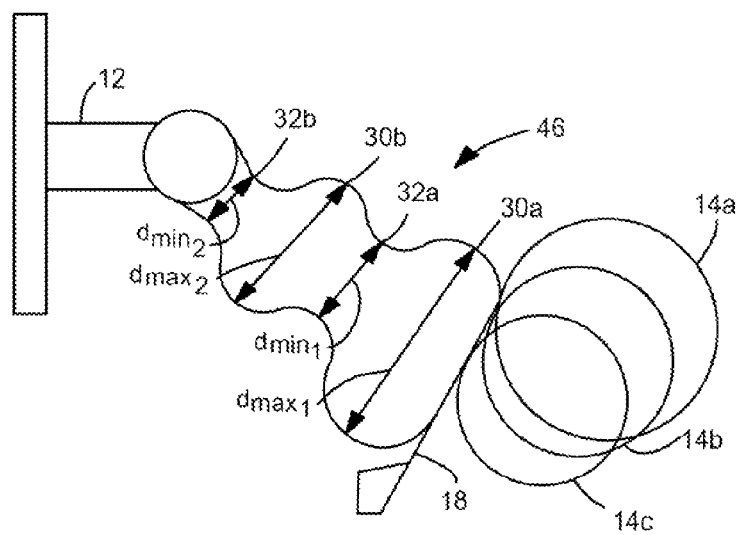
FIG. 3
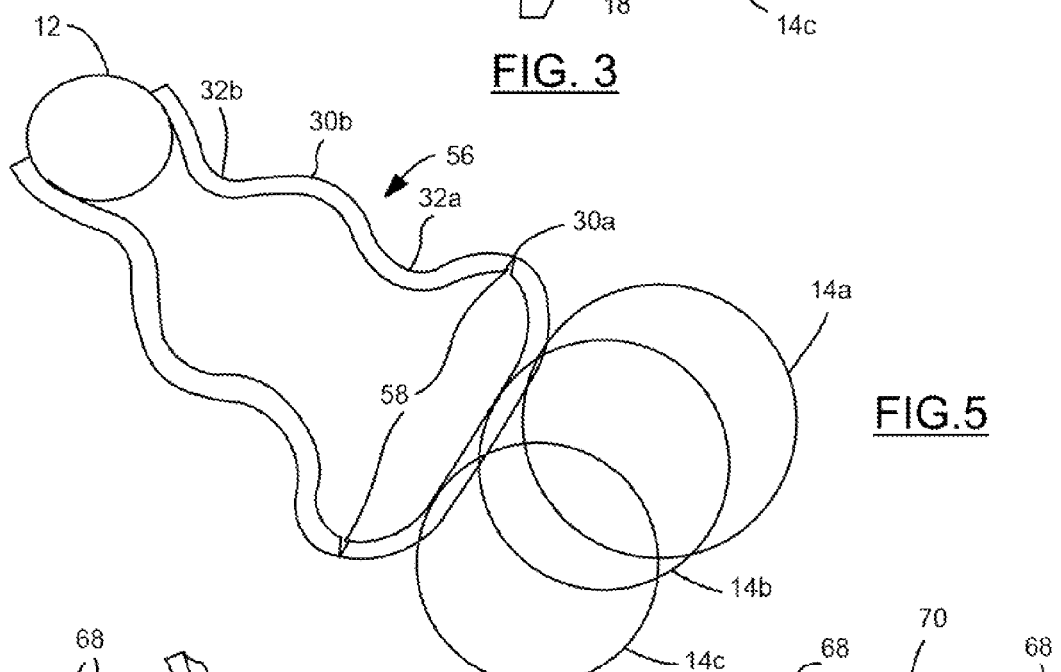
FIG. 5
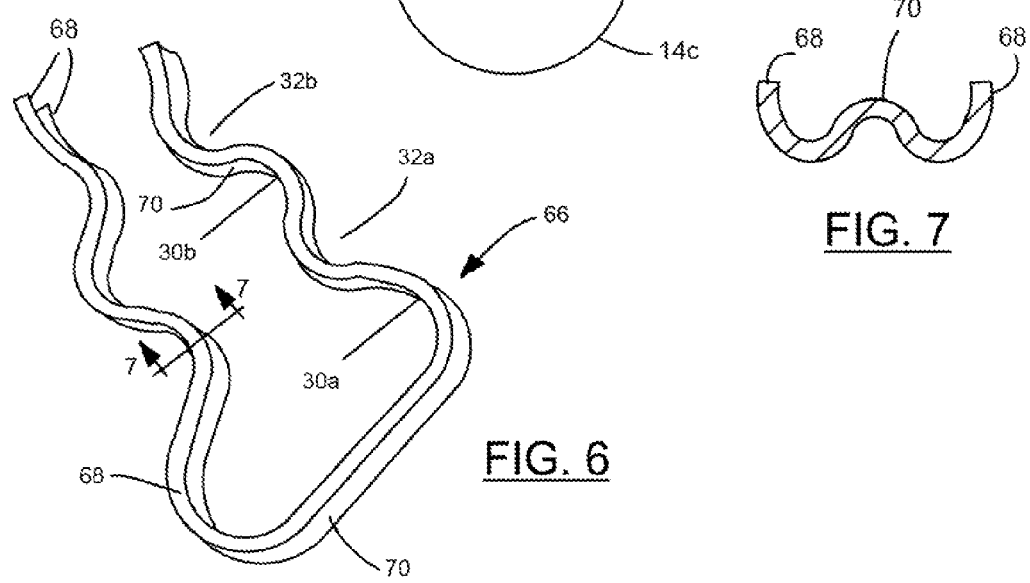
FIG. 6
FIG. 7

KNEE BOLSTER BRACKET

TECHNICAL FIELD

The inventive subject matter is directed to a knee bolster structure and more particularly to a knee bolster bracket for absorbing energy.

BACKGROUND

Energy absorbing structures for passive crash safety are critical to providing occupant protection in the event of a collision. A knee bolster, located at a point lower than the steering wheel and generally on a lower portion of the instrument panel, is designed to absorb the impact on an occupant's knee during a collision event. A knee bolster bracket is a supporting brace for the knee bolster. The knee bolster bracket is designed to yield, or collapse, when it absorbs energy during the collision event to protect the vehicle occupant. Traditional knee bolster bracket designs have "J" or "D" shapes such that there is a single hinge, or trigger, point that collapses upon impact with the occupant's knee, which typically occurs during a frontal crash event. A goal in knee bolster design is to minimize a load on the occupant's knee while maximizing the amount of energy absorbed by the bracket.

Vehicle occupants vary greatly in size and therefore, the knee bolster should be capable of protecting the occupant regardless of their size. For an occupant that is of average size, also known as an occupant in the $50^{th}$ percentile, the traditional "J" or "D" design is adequate for minimizing load and maximizing energy absorbed. However, for an occupant that is much larger than average ($95^{th}$ percentile) or much smaller than average ($5^{th}$ percentile), the occupant's knee may not contact the knee bolster in an optimal location so as to collapse at the trigger point designed for minimizing load and maximizing energy absorption. Therefore, the traditional design is not as effective for occupants outside of the average size.

There is a need for a knee bolster bracket design that minimizes load for any occupant whose size is between the $5^{th}$ percentile for females and the $95^{th}$ percentile for males, maximizes energy absorption for any occupant whose size is between these percentiles and is robust enough to meet stringent crash requirements that are imposed by transportation and safety boards.

SUMMARY

Embodiments of the inventive subject matter are directed to a knee bolster assembly having a vehicle frame structure, a bracket structure having a base portion and two contoured side wall portions that extend from the base portion to ends that attach to the frame structure, a trigger point occurs in each side wall portion at a first maximum width and a first minimum width between side wall portions, and a knee bolster plate cooperating with the base portion.

In another embodiment, the contoured side wall portions have a second maximum width and a second minimum width, a trigger point occurs in each side wall portion at the second maximum width and the second minimum width, defining a generally "squash-like" structure.

In yet another embodiment, the bracket structure has a continuous upper flange, a continuous lower flange, and a contoured web extending continuously between the upper and lower flanges.

In any of the embodiments of the inventive subject matter, the bracket structure may have a notch in at least one side wall portion located in a general vicinity of at least one trigger point.

DESCRIPTION OF DRAWINGS

FIG. 3 is a side view of another embodiment of the knee bolster bracket of the inventive subject matter as the knee bolster contacts an occupant in any one of the $5^{th}$ percentile, the $50^{th}$ percentile and the $95^{th}$ percentile for occupant size;

FIG. 5 is a side view of another embodiment of the knee bolster bracket; and

FIG. 6 is a perspective view of another embodiment of the knee bolster bracket of the inventive subject matter; and FIG. 7 is a cross-section view of the embodiment shown in FIG. 6.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures. like reference numbers will be used to illustrate the same components. Those skilled in the art will recognize that the various components set forth herein may be altered without varying from the scope of the inventive subject matter.

Figure 1:
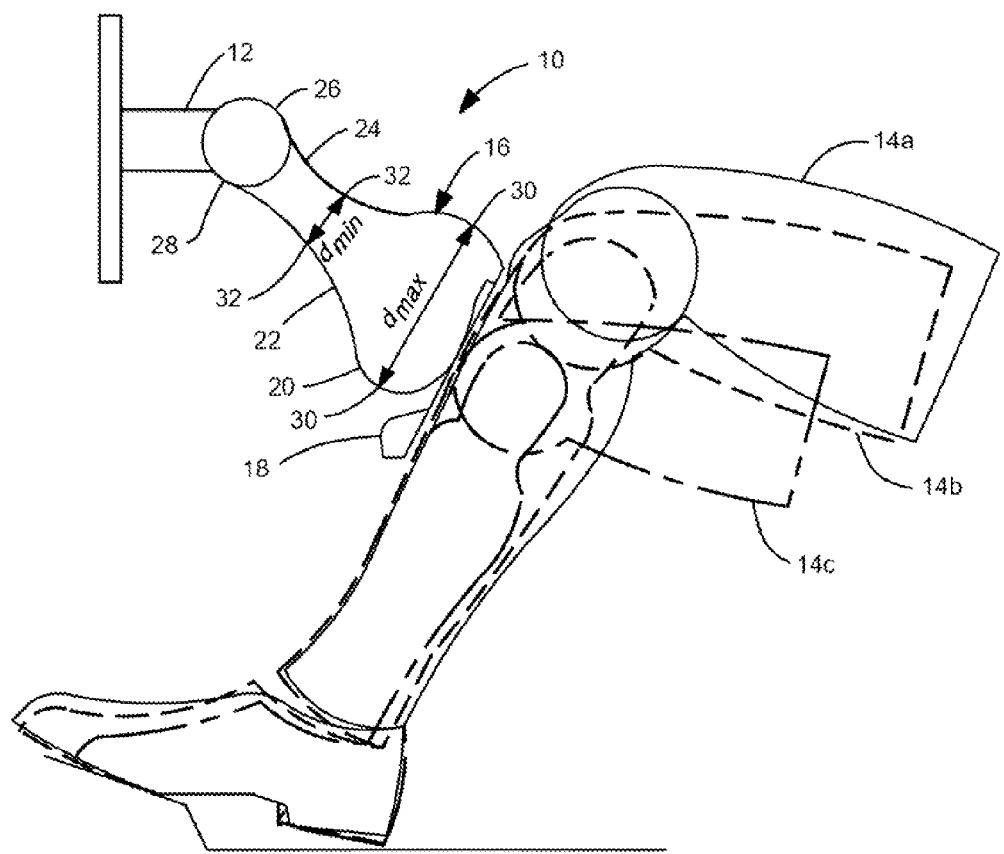
FIG. 1 is a side view of a knee bolster bracket of the inventive subject matter along with an occupant whose size is in any one of the $5^{th}$ percentile, the $50^{th}$ percentile and the $95^{th}$ percentile.

FIG. 1 shows an arrangement for an energy-absorbing knee bolster assembly 10 of the inventive subject matter. The knee bolster assembly 10 is fixed to a supporting interior frame structure 12 by fasteners, not shown. The assembly 10 is positioned in an area of an occupant's knee 14a, 14b, 14c at a distance and height determined by usual statistics governing interior vehicle design. In a typical arrangement, the knee bolster assembly includes one or more knee bolster brackets 16 (only one shown in side view of FIG. 1) having a knee bolster plate 18 in communication therewith.

Each knee bolster bracket 16 is contoured and sufficiently rigid so that it will withstand, without permanent deflection, any light collision by the knee bolster plate 18 as it contacts an occupant's knee 14a-c against the knee bolster assembly 10 when the light collision is below a predetermined impact load. At impact above the predetermined impact load, the knee bolster bracket 16 is designed to crush, or collapse, in a controlled manner when the occupant's knee 14a-c contacts the knee bolster plate 18 causing it to contact the knee bolster bracket 16, thereby deforming the bracket 16.

The contoured knee bolster bracket 16 of the inventive subject matter has a base portion 20 and side walls 22, 24 that extend from the base portion 20, contoured outward from the base portion 20 to define a first maximum width, $d_{max1}$ and gradually contoured inward from the first maximum width, $d_{max1}$, to define a first minimum width, $d_{min1}$. The side walls 22, 24 extend to ends 26, 28. Each end 26, 28 attaches in any suitable manner to the interior frame structure 12 of the vehicle. The knee bolster plate 18 is in communication with the base portion 22 of the knee bolster bracket 16. In FIG. 1, the knee bolster plate 18 is shown affixed directly to the contoured knee bolster bracket 16. In practice, and shown hereinafter in FIG. 4a, a gap may exist between the bracket 16 and the plate 18 to ensure an occupant, who is secured by a seat belt, has little or no direct contact with the bracket 16. Referring back to FIG. 1, the side wall 22, 24 contours of the knee bolster bracket 16 define multiple trigger points 30, 32. The trigger points 30, 32 fall generally at the contours of the bracket 16 near the points of maximum width, $d_{max}$ and minimum width, $d_{min}$ respectively. In the configuration shown in FIG. 2, the knee bolster bracket 16 is contoured to a generally pear-shaped configuration. In the event of a collision, the occupant's knee 14a-14c will contact the bolster plate 18 pushing it towards the knee bolster bracket 16 causing the knee bolster bracket 16 to deflect force by crushing, or collapsing, at the trigger points 30, 32.

If the force deflection is too high, there will not be enough knee travel for the occupant during a collision. If the force deflection is too low, there may be too much knee travel for the occupant during a collision. According to the inventive subject matter, the force deflection for an occupant between the $5^{th}$ and $95^{th}$ percentile may be controlled so that the resistance is appropriate for the size of the occupant. The knee bracket of the inventive subject matter is designed for continuous energy absorption and force deflection is dependent upon the position the occupant's knee interacts with base portion 20 of the knee bolster bracket 16, thereby providing appropriate force deflection in accordance with the occupant's size.

Figure 2:
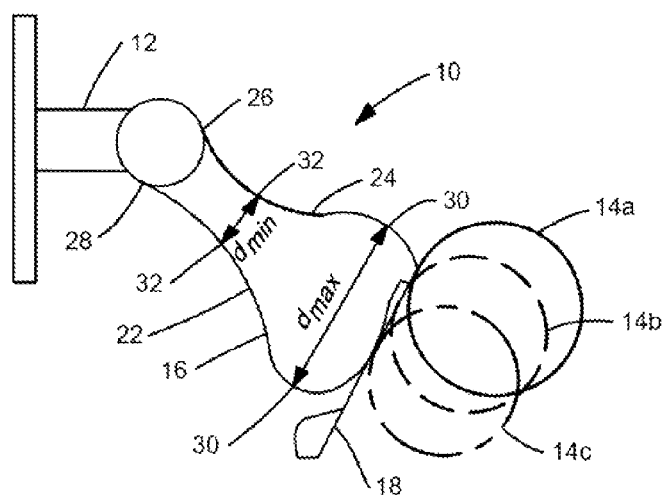
FIG. 2 is a side view of a first embodiment of the knee bolster bracket of the inventive subject matter as the knee bolster contacts an occupant's knee in any one of the $5^{th}$ percentile, the $50^{th}$ percentile and the $95^{th}$ percentile for occupant size.

Referring now to FIG. 2, for a female occupant in the $5^{th}$ percentile 14c, upon a collision, event the smallest load must be absorbed. The force deflection for a female occupant in the $5^{th}$ percentile, 14c requires the least amount of crush for the knee bolster bracket 16. For a male occupant in the $95^{th}$ percentile 14a, a larger load must be absorbed, so more travel distance is necessary when the bracket 16 is crushed in order to deflect the force of the impact. The knee 14c for a female occupant in the $5^{th}$ percentile will contact the bolster plate 18 such that the knee 14c is aligned generally at the center of the bracket base 22, resulting in the least amount of travel, or crush at the trigger points, during a collision. For a male occupant in the $95^{th}$ percentile, the knee 14a is aligned closer to the top of the bracket base 22, thereby providing more room for travel as the bracket crushes. As would be expected for a male occupant in the $50^{th}$ percentile, the knee 14b falls somewhere between the locations for the $5^{th}$ and $95^{th}$ percentile, and the travel required for crush is somewhere between the $5^{th}$ and $95^{th}$ percentile. With any size occupant, the contact position of the occupant's knee with the base portion 22 of the knee bolster bracket 16 will result in a different force deflection upon crush of the bracket 16 at the trigger points 30, 32.

Another embodiment of a bolster bracket 46 is shown in FIG. 3. The embodiment of FIG. 3 has a first maximum width, $d_{max1}$ and a second maximum width, $d_{max2}$. The knee bolster bracket 46 also has a first minimum width dmin1 and a second minimum width, dmin2. The maximum widths are relative to each other, wherein the second maximum width, $d_{max2}$, is generally smaller than the first maximum width, $d_{max1}$. Likewise, the second minimum width, $d_{min2}$, is generally smaller than the first minimum width, $d_{min1}$. The result is a bracket 46 having multiple trigger points 30a, 30b, 32a, 32b, the shape which generally resembles a squash. In this embodiment, the occupant's knee contact positions are the same, but the force deflection differs in that there are additional trigger points 30a, 30b and 32a, 32b, for force deflection. The result is a force deflection that is more responsive for a variety of vehicle occupant sizes.

Figure 4A:
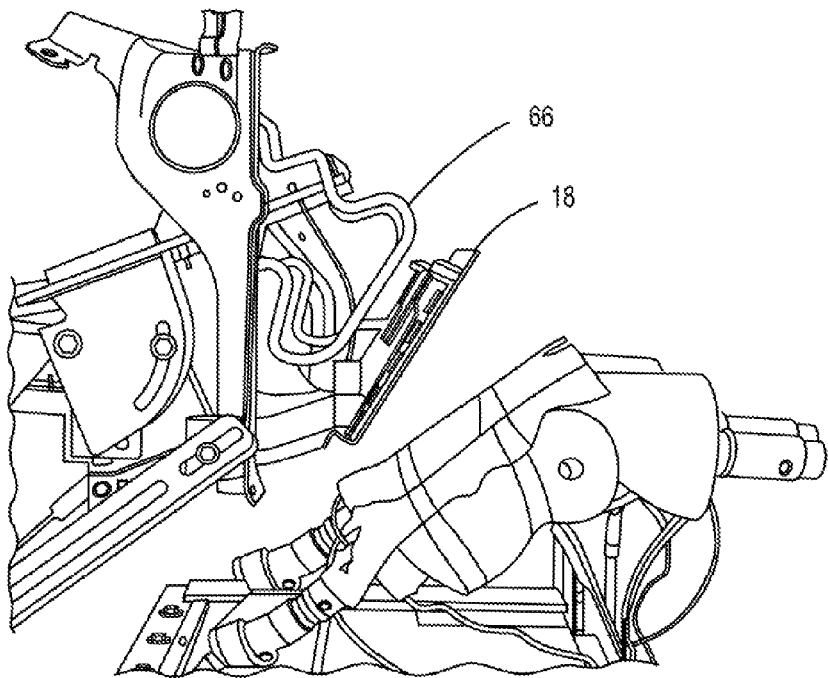
FIG. 4a is a pre-crash example of the knee bolster bracket of the inventive subject matter.
Figure 4B:
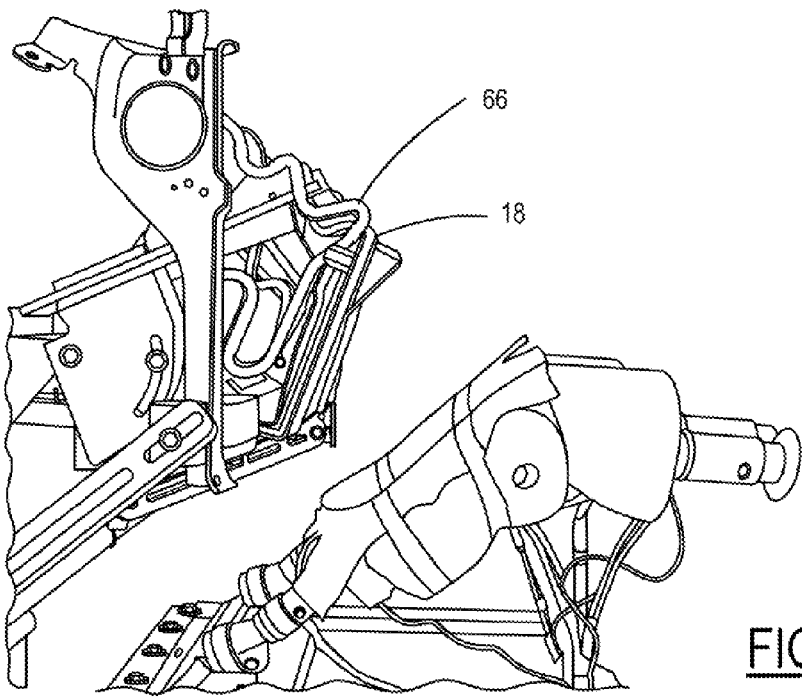
FIG. 4b is a post-crash example of the knee bolster bracket of the inventive subject matter.

FIGS. 4a and 4b reflect pre-crash and post-crash examples of the knee bolster bracket 46 described with reference to FIG. 3. FIG. 4a shows the bracket 46 and knee bolster plate 18 arrangement prior to a crash event. During a collision event, the occupant's knee pushes the knee bolster plate 18 toward the knee bolster bracket 46. The knee bolster bracket 46 deflects the force of the impact away from the knee bolster plate and the occupant's knee by travelling away from the knee as the knee bolster bracket crushes. After the collision event, the bracket 46 collapses at the trigger points 30a, 30b, 32a, 32b as shown in FIG. 4b.

Yet another embodiment of the knee bolster bracket 56 is shown in FIG. 5. In this embodiment, one or more notches 58 are provided at the trigger points. The notches 58 may be implemented in any of the design configurations disclosed herein with respect to FIGS. 1-5. In a bracket 16 that has any number of trigger points, a notch 58 is located at the trigger point. The notches 58 are generally located at any one or more of the trigger points 30a, 30b, 32a, 32b for the purpose of improving the force deflection response during a collision event.

In still another embodiment of the knee bolster bracket 66, shown in perspective view in FIG. 6 and in cross-section in FIG. 7, the shape of a structural component that makes up the knee bolster bracket has cross-sectional detail that affects the deformation or crush of the bracket at the trigger points. The structural component of the bracket 66 has a contoured web portion 70 between continuous upper and lower flanges 68. The contoured web portion 70 and flanges 68 are arranged as shown in cross-section in FIG. 7 and are designed to provide a required stiffness that is necessary for a desired system performance. The structural component having a web portion 70 and upper and lower flanges 68 used in the bracket 66 may be contoured into any desired design configuration discussed with reference to FIGS. 1-5 above, i.e., pear shape, squash shape, etc. Furthermore, the structural component of the bracket having a contoured web portion 70 with upper and lower flanges 68 may also have notches 58 strategically placed at one or more trigger points.

The knee bolster bracket 16, 46, 56, 66 of the present invention may be of any suitable material, such as aluminum or steel. The cross-sectional dimensions and the number and spacing of the contours in the side walls may vary depending on the material used to manufacture the bracket. Likewise the number of notches 48 in the bracket may vary. However, in any embodiment, each notch 48 is strategically positioned to coincide with at least one of the trigger points 30, 30a, 30b, 32, 32a, 32b.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention.

Accordingly, the scope of the invention should be determined by the claims and their legal equivalents rather than by merely the examples described.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A knee bolster assembly comprising:
   a supporting interior frame structure;
   a bracket structure having a base portion and two contoured side wall portions that extend from the base portion to ends that attach to the frame structure, a trigger point occurs in each side wall portion at a first maximum width and a first minimum width between side wall portions;
   the bracket structure having a continuous upper flange;
   the bracket structure having a continuous lower flange;
   a contoured web extending continuously between the upper and lower flanges wherein forward edges of the respective flanges are arranged such that an entire length of the respective forward edges of the upper and lower flanges extend radially away from the supporting interior frame structure; and
   a knee bolster plate cooperating with the base portion.

2. The knee bolster assembly as claimed in claim 1 wherein the bracket structure further comprises a notch in at least one side wall portion located in a general vicinity of at least one trigger point.

3. The knee bolster assembly as claimed in claim 1 wherein the contoured side wall portions further comprise a second maximum width and a second minimum width, a trigger point occurs in each side wall portion at the second maximum width and the second minimum width.

4. The knee bolster assembly as claimed in claim 3 further comprising a notch in the bracket structure located in a general vicinity of at least one trigger point.

5. The knee bolster assembly as claimed in claim 1 wherein the contoured side wall portions further comprise a second maximum width and a second minimum width.

6. The knee bolster assembly as claimed in claim 1 further comprising a notch in at least one side wall portion located in a general vicinity of at least one trigger point.

7. A knee bolster bracket comprising:
   a base portion;
   first and second contoured side wall portions that extend from the base portion to first and second ends that attach to a supporting interior frame structure;
   at least a first maximum width between the contoured side wall portions defining a trigger point in each side wall portion at the first maximum width;
   at least a first minimum width between the contoured side wall portions defining a trigger point in each side wall portion at the first minimum width;
   a continuous upper flange;
   a continuous lower flange;
   a contoured web extending continuously between the upper and lower flanges wherein forward edges of the respective flanges are arranged such that an entire length of the respective forward edges of the upper and lower flanges extend radially away from the supporting, interior frame structure.

8. The knee bolster bracket as claimed in claim 7 further comprising a notch in at least one side wall portion located in a general vicinity of at least one trigger point.

9. The knee bolster bracket as claimed in claim 7 further comprising:
   a second maximum width smaller than the first maximum width, the contoured side wall portions defining a trigger point in each side wall portion at the second maximum width; and
   a second minimum width, smaller than the first minimum width, the contoured side wall portions defining a trigger point in each side wall portion at the second minimum width.

10. The knee bolster bracket as claimed in claim 9 further comprising a notch in at least one side wall portion located in a general vicinity of at least one trigger point.

11. The knee bolster bracket as claimed in claim 7 wherein the contoured side wall portions further comprise a second maximum width smaller than the first maximum width and a second minimum width smaller than the first minimum width, a trigger point occurs in each side wall portion at each of the second maximum and second minimum widths.

12. The knee bolster bracket as claimed in claim 7 further comprising a notch in at least one side wall portion located in a general vicinity of at least one trigger point.

13. An energy absorbing bracket comprising:
   a continuous structure contoured to form a base portion and first and second side wall portions extending from the base portion to first and second ends that attach to a supporting interior frame structure;
   a first maximum width defined between the contoured side walls defining trigger points in the contoured side walls located in a general vicinity of a first maximum distance between the contoured side walls;
   a first minimum width defined between the contoured side walls defining trigger points in the contoured side walls located in a general vicinity of a first minimum distance between the contoured side walls;
   a continuous upper flange of the continuous structure;
   a continuous lower flange of the continuous structure; and
   a contoured web extending continuously between the upper and lower flanges wherein forward edges of the respective flanges are arranged such that an entire length of the respective forward edges of the upper and lower flanges extend radially away from the supporting interior frame structure.

14. The energy absorbing bracket as claimed in claim 13 further comprising a notch in at least one side wall portion located in a general vicinity of at least one trigger point.

15. The energy absorbing bracket as claimed in claim 13 further comprising:

a second maximum width beim!, smaller than the first maximum width, a trigger point occurs in each side wall portion at the second maximum width; and a second minimum width being smaller than the first minimum width, a trigger point occurs in each side wall portion at the second minimum width.

16. The energy absorbing bracket as claimed in claim 15 further comprising a notch in at least one side wall portion located in a general vicinity of at least one trigger point.

17. The energy absorbing bracket as claimed in claim 13 wherein the contoured side wall portions further comprise a second maximum width smaller than the first maximum width and a second minimum width smaller than the first minimum width, a trigger point occurs in each side wall portion at each of the second maximum and second minimum widths.

18. The energy absorbing bracket as claimed in claim 13 further comprising a notch in at least one side wall portion located in a general vicinity of at least one trigger point.

* * * * *